United States Patent [19]

Ozeki

[11] 4,184,754
[45] Jan. 22, 1980

[54] OVERHEAD PROJECTOR

[75] Inventor: Jiro Ozeki, Tokyo, Japan

[73] Assignee: Keihoku Seiki Manufacturing Company, Tokyo, Japan

[21] Appl. No.: 846,199

[22] Filed: Oct. 27, 1977

[51] Int. Cl.$^2$ ............................................. G03B 21/14
[52] U.S. Cl. ..................................... 353/27 R; 353/21; 353/95; 353/DIG. 5
[58] Field of Search ................. 353/27 R, 103, 95, 96, 353/23, 21, DIG. 5

[56] References Cited

U.S. PATENT DOCUMENTS

| | | | |
|---|---|---|---|
| 3,264,767 | 8/1966 | Coffman | 353/DIG. 5 |
| 3,269,261 | 8/1966 | Porter | 353/DIG. 5 |
| 3,466,126 | 9/1969 | Sakamoto | 353/103 |
| 3,542,463 | 11/1970 | Klein | 353/DIG. 5 |
| 3,642,359 | 2/1972 | Kitch | 353/DIG. 5 |
| 3,709,590 | 1/1973 | Bisberg | 353/DIG. 5 |
| 3,807,850 | 4/1974 | Ozeki | 353/23 |

*Primary Examiner*—Steven L. Stephan
*Attorney, Agent, or Firm*—Fleit & Jacobson

[57] ABSTRACT

An overhead projector comprises a stage having at least two guide members fixed to its upper surface and movable longitudinally and transversely above a projector body, a file page having a plurality of slide films fitted therein in rows and columns and pairs of reference edges spaced apart at equidistances from crosswise and lengthwise center axes of the file page and adapted to abut against the guide members of the stage for positioning the file page relative to the stage, and positioning means for determining movements of the stage at determined intervals. The slide films in the file page are spaced apart at distances correspondingly equal to the movement distances determined by the positioning means. The projector is capable of correctly positioning a file page relative to the stage with ease after the file page has been rotated or turned upside down for changing over the projection methods of the projector, such as reflection projection and transmission projection.

8 Claims, 8 Drawing Figures

OVERHEAD PROJECTOR

BACKGROUND OF THE INVENTION

(1) Field of the Invention

The present invention relates to an overhead projector, and more particularly to a projector capable of correctly positioning a file page with ease after it has been rotated through 90° or 180° or turned upside down for changing over the projection methods of the projector, such as reflection and transmission projections.

(2) Description of the Prior Art

In projecting picture images of slide films, there are the reflection projection wherein images are projected onto a white or silver screen, and the transmission projection wherein images are projected onto a screen which transmits and diffuses light beams, and recently the latter has been widely used. With the transmission projection, a user is on the back side or rear side of the screen, so that the screen is accessible for detailed observation without casting a shadow of the user onto the screen and the picture image on the screen can be directly copied onto a blank paper. In addition to such advantages, the picture images can be clearly observed in a bright room and is given a cubic or three-dimensional mode.

Heretofore, however, when a projector is changed from the reflection projection to the transmission projection if desired, turned over images will be projected on the screen. Consequently, a mirror should be arranged between the projector and the screen, or the slide films received in a magazine should be turned upside down to obtain errect images on the screen.

However, the arrangement of the mirror requires equipment in connection therewith. In the event of turning the slide film upside down, a number of slide films in magazines or file pages must be turned upside down one by one which is very troublesome.

SUMMARY OF THE INVENTION

It is an object of this invention to overcome the above described difficulties heretofore encountered in projectors and to provide an improved overhead projector adapted to bring center axes of slide films of file pages coincident with an optical axis of the projection light beam with ease when the file page is moved or turned upside down for changing the projection mode.

According to the invention the overhead projector including a stage movable longitudinally and transversely above a projector body, a file page having a plurality of slide films fitted therein in rows and columns and located on said stage, and positioning means for determining movement distances of said stage at determined distance intervals, comprises at least two guide members fixed to an upper surface of said stage, pairs of reference edges provided on the file page spaced apart at equidistances from crosswise and lengthwise center axes of the file page and abutting against said guide members when the file page is positioned on the stage, said slide films in the file page being spaced apart at distances correspondingly equal to said movement distances determined by said positioning means, thereby enabling centers of said slide films to be in registry with an optical axis with ease upon positioning said file page after changed upper and lower sides of the file page and turned upside down.

BRIEF DESCRIPTION OF THE DRAWING

These and other objects of the invention will become clear to those skilled in the art by referring to the description taken in connection with the accompanying drawing, in which.

DESCRIPTION OF THE PREFERRED EMBODIMENT

Figure 1:
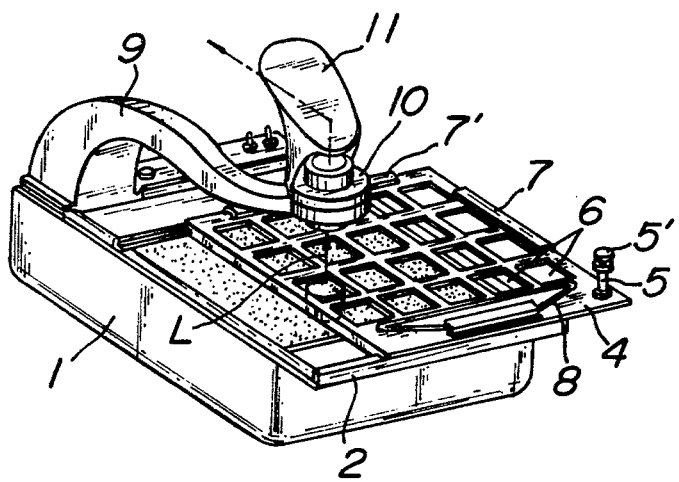
FIG. 1 is a perspective view of a preferred embodiment of the projector according to the invention.

Referring to FIG. 1 illustrating a preferred embodiment, an overhead projector according to the invention comprises a main body 1 housing therein a condensing lens and a lamp for a light source (not shown), on which is arranged a crosshead 2 slidably movable on pairs of rails in longitudinal and traverse directions. On the crosshead 2 there is provided a stage 4 for arranging thereon file page 3 as explained in detail later.

Figure 6A:
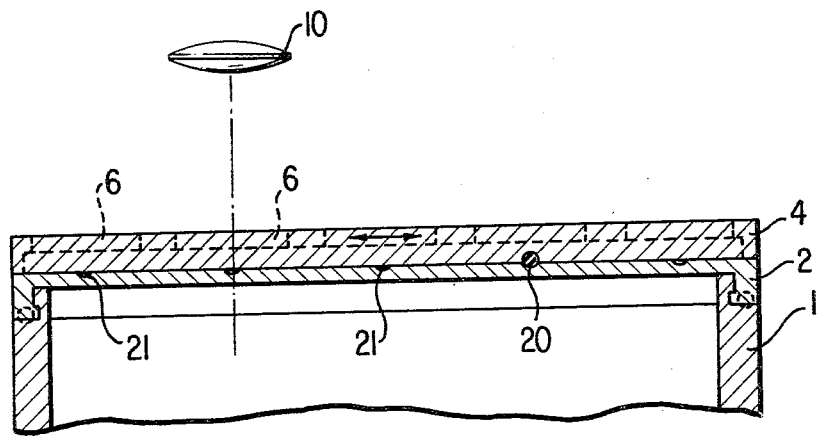
FIG. 6a is a schematic illustration used in explaining the restrained transverse movement of the projector stage.
Figure 6B:
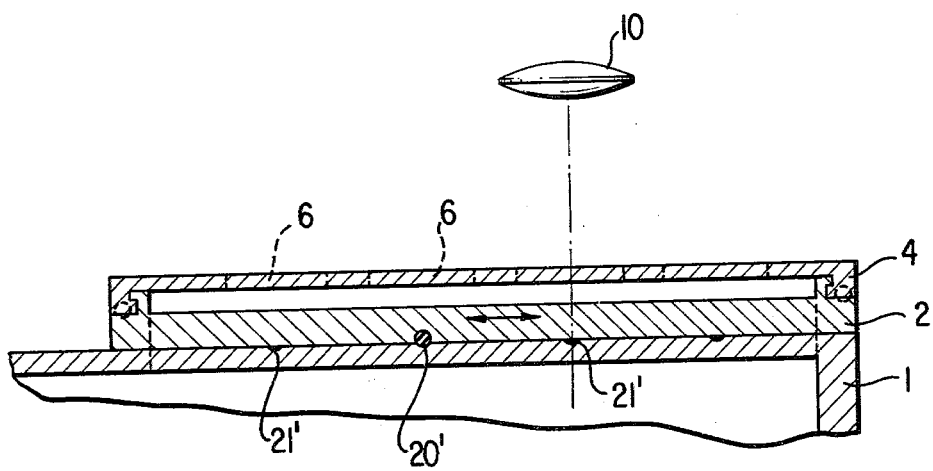
FIG. 6b is a schematic illustration used in explaining the restrained longitudinal movement of the projector stage.

With reference to FIGS. 6a and 6b, the movements of the stage 4 in the longitudinal and traverse directions are restrained at determined intervals by a known positioning means for example consisting of balls 20 and 20' and recesses 21 and 21'' arranged below the crosshead 2. Such a positioning means is constructed only to increase the resistance against the movement of the stage 4 at the determined movement distances, so that the stage 4 could be moved to its extreme ends of the longitudinal and transverse movements by continuously pushing or pulling it. In order to move the stage 4 more smoothly, however, it is preferable to provide a disengaging means 5 on the stage 4, which cooperates with the positioning means. When release the interengagement of the ball with the recesses, the stage 4 is able to move smoothly without any resistance.

While this embodiment, the stage 4 is formed with a plurality of square holes 6 through which projecting light beam from the main body 1 passes. The holes are so arranged that a center of each hole 6 will be in registry with an optical axis L of the projecting light beam when the stage 4 is positioned at the above determined intervals. The size of these square holes 6 and the intervals for positioning the stage 4 must of course be determined depending upon a shape of a slide film. The relative positions of the square holes 6 are preferably in symmetry with respect to the longitudinal and transverse center axes of the stage 4 and the distances between the square holes in the longitudinal and traverse directions are preferably constant, respectively.

In the proximity of the peripheries of the square stage 4, there is provided two guide members 7 and 7' whose extension lines intersect perpendicularly. With this embodiment, the guide members 7 and 7' are shown having a Γ-shaped crosssection. The guide members may be mere ridges having flat inner surfaces, or mere pin-shaped protrusions. A file page 3 is located on the stage 4 with their edges abutting against the guide members 7 and 7' and is clamped by means of a clip for fastening one edge of the file page, thereby securely preventing a relative movement of the file page 3 to the stage 4.

The projection light which has been transmitted through a slide film passes through a projection lens 10 carried by a support arm 9 and reflects at a reflecting mirror 11 provided above the projection lens 10 towards a screen as shown in phantom lines.

Figure 2:
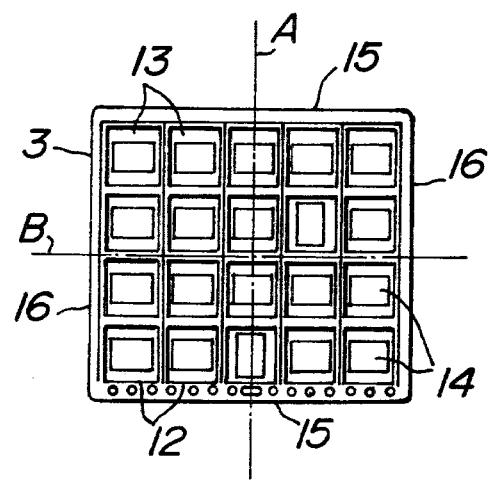
FIG. 2 is a plan view of a file page to be used for the projector according to the invention.

FIG. 2 illustrates the file page 3 which comprises a plurality of film receiving recesses 12 corresponding to the optical axis L and the square holes 6 above described. Within each the recess 12 is accommodated slide film 14 embraced by a film mount 13 with free selection of their lengthwise and crosswise positions and their obverse and reverse surfaces. The file page 3 shown in FIG. 2 is provided at their opposite sides with pairs of reference edges or surfaces 15 and 16 which are adapted to abut against the engagement surfaces of the guide members 7 and 7' to properly position the file page 3 relative to the stage 4.

These reference edges of the file page 3 are arranged at equidistances from crosswise and lengthwise center axes A and B thereof, respectively. The film receiving recesses 12 are arranged in symmetry with respect to the center axes A and B as in the same manner in the square holes 6 of the stage 4, so that the center axes of the slide films 14 will be exactly in registry with the optical axis L of the projecting light beam, even if the file page 3 is positioned on the stage 4 upside down or in a rotated position through 90 to 180 degrees. The distances between the film receiving recesses 12 in the longitudinal and traverse directions are preferably constant, respectively.

Figure 3A:
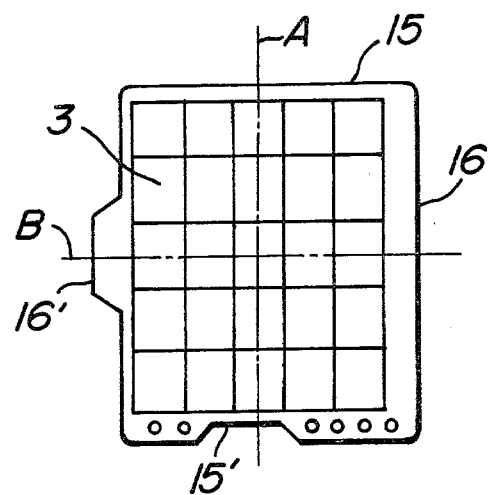
FIG. 3a is a plan view of another example of a file page for use in the projector according to the invention.
Figure 3B:
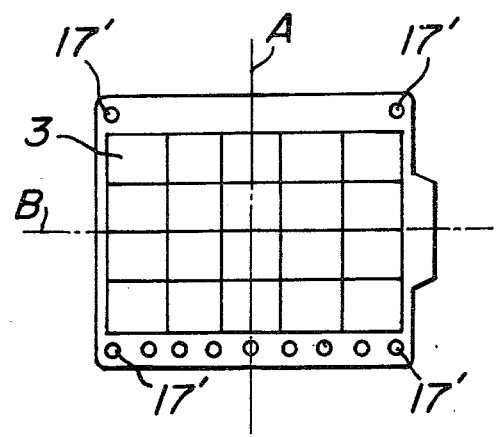
FIG. 3b is a plan view of further example of a file page.

FIGS. 3a and 3b illustrate file pages having modified enclosing surfaces. Referring to FIG. 3a, one of two crosswise reference edges is notched or recessed to form a recess as shown at 15' and one of two lengthwise reference edges is extended or protruded to form a lug as shown at 16'. With this arrangement there are advantages in that the recessed reference edge 15' has less chance of damage resulting from a contact with an obstacle, and the protruded reference edge 16' could be utilized as a guide on which an index is written.

Figure 4:
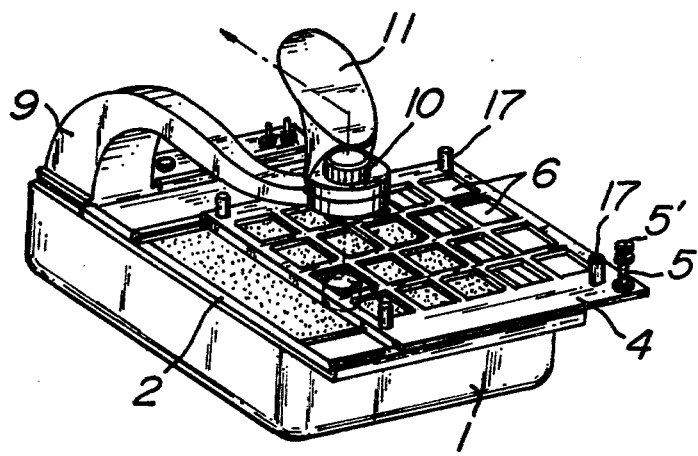
FIG. 4 is perspective view of another embodiment of the projector according to the invention.
Figure 5:
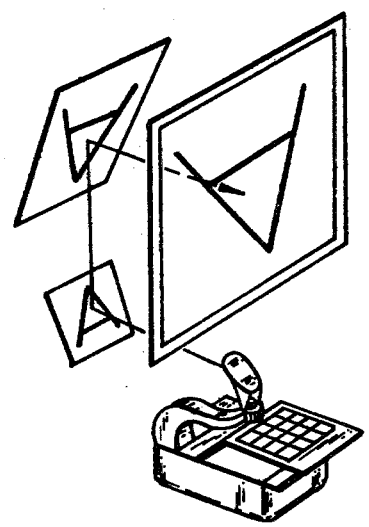
FIG. 5 is a diagrammatic perspective view showing a projected condition of a picture image.

Referring to FIG. 3b, a file page 3 is formed at its corners with guide holes 17' spaced apart at equidistances from the center lines A and B, respectively. The guide holes 17' serve to position the file page by an engagement of the guide holes 17' with positioning pins 17 embedded in the upper surface of the stage 4 (FIG. 4). The guide holes 17' are preferably in symmetry with respect to the center lines A and B respectively in the same manner as in the square holes 6 and film receiving recesses 12.

As shown in FIG. 3b, the file page may be formed in its one reference edge with a lug without recess in the other reference surface.

As an alternative, a file page 3 is provided at respective opposite positions on its both surfaces with ridges which are adapted to engage guide members provided on the upper surface of the stage 4 for positioning the file page on the stage 4.

When a transmission projection is required during a reflection projection by the projector, the clip 8 is opened and a file page is turned upside down and positioned on the stage with the aid of abutments of the reference edges 15 and 16 against the guide members 7 and 7', with the result that the optical axis L is correctly aligned with the center of the slide film 14 to effect the transmission projection with ease in spite of the turning of the file page.

Irrespective of the upside down turning of the file page, the center of the slide film 14 is kept in alignment with the optical axis L, so that an inverted image can be easily corrected to an erect image even if a relatively large image must be projected by the transmission projection in a small room.

As above described according to the invention films can be reliably positioned with respect to the optical axis with ease without requiring any direction conversion of each slide film and equipment. Particularly, the projector according to the invention can be simply changed from a reflection projector to a transmission projector, and vice versa.

While the invention has been particularly shown and described with reference to preferred embodiments thereof, it will be understood by those skilled in the art that the foregoing and other changes in form and details can be made therein without departing from the spirit and scope of the invention.

What is claimed is:

1. Apparatus, changeable between reflection projection and transmission projection modes, for projecting, onto an appropriate screen, image-containing slide films, said apparatus comprising:
   an overhead projector including a projector body;
   a stage movable longitudinally and transversely above a projector body;
   positioning means for determining movement distances of said stage at determined distance intervals;
   at least two guide members fixed to an upper surface of said stage;
   a file page having a plurality of said slide films fitted therein in rows and columns, said slide films being spaced apart, in said file page, at distances correspondingly equal to said movement distances determined by said positioning means;
   a plurality of reference edges provided on the file page spaced apart at equidistances from crosswise and lengthwise center axes of the file page and abutting against said guide members when the file page is positioned on the stage, and
   wherein, upon the change of projection modes, said file page may be reoriented into any position onto said stage for proper orientation of slide images as they appear on said screen, said guide members and said reference edges cooperating in a butting relationship for ensuring that said reoriented file page is positioned on said stage so that the repositioned slide films are spaced apart at distances correspondingly equal to movement distances determined by said positioning means, thereby eliminating the need of correcting each slide film orientation by removal and re-insertion of each individual slide film relative to said file page.

2. An overhead projector as set forth in claim 1, wherein said guide members have Γ-shaped crosssection.

3. An overhead projector as set forth in claim 1, wherein said guide members are ridges having flat inner surfaces.

4. An overhead projector as set forth in claim 1, wherein said guide members are pins.

5. An overhead projector as set forth in claim 1, wherein one of the reference edges is formed with a lug.

6. An overhead projector as set forth in claim 1, wherein one of the reference edges is formed with a recess and the other of the reference edges is formed with a lug.

7. Apparatus, changeable between reflection projection and transmission projection modes, for projecting, onto an appropriate screen, image-containing slide films, said apparatus comprising:
an overhead projector including a projector body;
a stage movable longitudinally and transversely above a projector body;
positioning means for determining movement distances of said stage at determined distance intervals;
at least two guide pins embedded in an upper surface of said stage;
a file page having a plurality of said slide films fitted therein in rows and columns, said slide films being spaced apart, in said file page, at distances correspondingly equal to said movement distances determined by said positioning means;
a plurality of guide holes provided on the file page spaced apart at equidistances from crosswise and lengthwise center axes of the file page for positioning said file page relative to said stage; and
wherein, upon the change of projection modes, said file page may be reoriented into any position onto said stage for proper orientation of slide images as they appear on said screen, said guide pins and said guide holes cooperating in a registering relationship for ensuring that said reoriented file page is positioned on said stage so that the repositioned slide films are spaced apart at distances correspondingly equal to movement distances determined by said positioning means, thereby eliminating the need of correcting each slide film orientation by removal and re-insertion of each individual slide film relative to said file page.

8. Apparatus, changeable between reflection projection and transmission projection modes, for projecting, onto an appropriate screen, image containing slide films, said apparatus comprising:
an overhead projector including a projector body;
a stage movable longitudinally and transversely above a projector body;
positioning means for determining movement distances of said stage at determined distance intervals;
at least two guide members fixed to an upper surface of said stage;
a file page having a plurality of said slide films fitted therein in rows and columns, said slide films being spaced apart, in said file page, at distances correspondingly equal to said movement distances determined by said positioning means;
a plurality of ridge-containing reference edges provided on said file page spaced apart at equidistances from crosswise and lengthwise center axes of said file page and engaging with said guide members when said file page is positioned on said stage, and
wherein, upon the change of projection modes, said file page may be reoriented into any position onto said stage for proper orientation of slide images as they appear on said screen, said guide members and said ridge-containing reference edges cooperating in a engaging relationship for ensuring that said reoriented file page is positioned on said stage so that the repositioned slide films are spaced apart at distances correspondingly equal to movement distances determined by said positioning means, thereby eliminating the need of correcting each slide film orientation by removal and re-insertion of each individual slide film relative to said file page.

* * * * *